United States Patent
Babka et al.

(10) Patent No.: US 7,062,493 B1
(45) Date of Patent: Jun. 13, 2006

(54) EFFICIENT TECHNIQUE FOR MATCHING HIERARCHIES OF ARBITRARY SIZE AND STRUCTURE WITHOUT REGARD TO ORDERING OF ELEMENTS

(75) Inventors: James J. Babka, Round Rock, TX (US); Razvan Surdulescu, Austin, TX (US)

(73) Assignee: Trilogy Software, Inc., Austin, TX (US)

( * ) Notice: Subject to any disclaimer, the term of this patent is extended or adjusted under 35 U.S.C. 154(b) by 598 days.

(21) Appl. No.: 09/898,708

(22) Filed: Jul. 3, 2001

(51) Int. Cl.
*G06F 17/30* (2006.01)

(52) U.S. Cl. .............................. 707/100; 707/3; 707/5; 707/6; 707/103

(58) Field of Classification Search ................ 707/200, 707/100, 102, 3, 2, 1, 101, 6, 103, 5
See application file for complete search history.

(56) References Cited

U.S. PATENT DOCUMENTS

| | | | | |
|---|---|---|---|---|
| 5,781,906 A | * | 7/1998 | Aggarwal et al. | 707/102 |
| 5,940,833 A | * | 8/1999 | Benson | 707/100 |
| 6,292,938 B1 | * | 9/2001 | Sarkar et al. | 717/6 |
| 6,311,187 B1 | * | 10/2001 | Jeyaraman | 707/10 |
| 6,427,417 B1 | * | 8/2002 | Sagy | 52/741.13 |
| 6,539,369 B1 | * | 3/2003 | Brown | 707/1 |
| 6,618,733 B1 | * | 9/2003 | White et al. | 707/103 Y |
| 6,751,659 B1 | * | 6/2004 | Fenger et al. | 709/223 |

OTHER PUBLICATIONS

Cormen, Leiserson and Rivest, *Introduction to Algorithms*, The MIT Press, Cambridge, MA, 1995, Chap. 5 "Sets, Etc.", pp. 77-98.

* cited by examiner

*Primary Examiner*—Cam-Y Truong
(74) *Attorney, Agent, or Firm*—Zagorin O'Brien Graham LLP

(57) ABSTRACT

An element order independent comparison of hierarchically organized data structures may be performed efficiently using a transformation operation that orthogonally and recursively encodes child node information. In some implementations, a hash table is defined for which values are encoded as powers of two. Each value is therefore orthogonal when combined using simple binary addition. At any particular node, a concatenation of node-specific information with a sum of child-node hashes is, itself, hashed and associated with the node. Orthogonal encodings ensure that a combination (e.g., an additive combination) of values corresponding to elements of a sub-hierarchy is insensitive to ordering of the elements. Recursion can be employed to fold in information contributions at successive layers of an information hierarchy.

40 Claims, 8 Drawing Sheets

EFFICIENT TECHNIQUE FOR MATCHING HIERARCHIES OF ARBITRARY SIZE AND STRUCTURE WITHOUT REGARD TO ORDERING OF ELEMENTS

BACKGROUND OF THE INVENTION

1. Field of the Invention

The invention relates generally to representations of hierarchically organized information and, in particular, to data structures, objects, methods and techniques for matching or, in some realizations, efficiently representing sub-hierarchies thereof.

2. Description of the Related Art

Hierarchically organized data structures are well known in the art and are commonly used in a variety of software implementations and algorithms. In particular, tree-oriented data structures are often used in representations of component/sub-component decompositions of parts or attributes of physical systems. In such applications, successive levels of the tree typically represent additional levels of specialization, resolution or refinement. Tree-oriented data structures are also employed in the representation and/or presentation of information organizations, such as for directory structures, registry information and parse trees.

In general, the particular organization and/or physical encoding employed depend on design constraints or requirements of a particular application. Typically, or at least illustratively, tree-oriented data structures are organized using a hierarchy of nodes, often with associated node information or values and references to other nodes. Other encodings include tagged linear encodings such as using an extensible Markup Language (XML) wherein hierarchies are encoded using nesting. Whatever the particular encoding technique, a node at a higher level in a hierarchy is conventionally known as a parent node and a node (or nodes) at a lower level is (are) known as a child node(s). A highest-level node is often known as a root node and terminal nodes (i.e., nodes that do not themselves refer to other nodes) are known as leaf nodes. Typically, interior nodes have associated node information or values; although some applications of trees or tree-oriented may limit information and values to leaf nodes.

For many applications that employ hierarchically organized data structures, an important class of functionality involves comparison of sub-hierarchies. For example, identification of identical or equivalent subassemblies of parts can be an important function of a product configuration system. In many such applications, product configurations may be appropriately handled as hierarchies of unordered sets. That is to say, for many applications, a subassembly M that consists of components A, B and C is identical (or at least equivalent) to a subassembly M' that consists of components B, C and A.

Unfortunately, techniques that allow comparison and matching of sub-hierarchies without regard to ordering of elements have generally employed a sorting of elements as a precursor to comparison. In effect, ordering is eliminated as a distinguishing characteristic by ensuring that all orderings of the same elements are themselves the same. Unfortunately, sorting is a computationally expensive operation. For many implementations, a sorting-based solution leads to $O(N \log_2 N)$ scaling. Accordingly, data structures and related techniques are desired whereby improved scaling performance can be achieved while providing efficient matching, comparison or collapsing of hierarchies of arbitrary size and structure without regard to ordering of elements therein.

SUMMARY OF THE INVENTION

Accordingly, it has been discovered that an element order independent comparison of hierarchically organized data structures may be performed efficiently using a transformation operation that orthogonally and recursively encodes child node information. In some implementations, a hash table is defined for which values are encoded as powers of two. Each value encoding is therefore orthogonal when combined using simple binary addition. At any particular node, a concatenation of node-specific information with a sum of child-node hashes is, itself, hashed and associated with the node. Orthogonal encodings ensure that a combination (e.g., an additive combination) of values corresponding to elements of a sub-hierarchy is insensitive to ordering of the elements. Recursion can be employed to fold in information contributions at successive layers of an information hierarchy.

In some embodiments in accordance with the present invention, hash encodings for multiple sub-hierarchies are compared to establish order-insensitive identity or equivalence. In some embodiments in accordance with the present invention, multiple identical or equivalent sub-hierarchies are collapsed into a single hash table entry. For example, in a data structure that encodes a product configuration, multiple identical subassemblies may resolve to a single data encoding. In some realizations, separate hash tables may be employed at various levels of a hierarchy. In some realizations, a single hash table may encode entries corresponding to multiple levels of a hierarchy. Such a realization can be particularly attractive in applications where identical or equivalent sub-hierarchies may appear at different levels. One advantage of some techniques in accordance with the present invention is that it facilitates comparison operations in roughly linear computational time (e.g., $O(n)$).

In one embodiment in accordance with the present invention, a method of identifying equivalent portions of one or more unsorted hierarchically-organized data structures includes collapsing plural nodes thereof into respective representations that each incorporate information of a respective node and that of any child nodes thereof and, based on correspondence of particular instances of the collapsed representations, identifying the respective portions as equivalent. The collapsing is order-insensitive with respect to information of the respective child nodes. In some variations, a unit of orthogonally-encoded child node information includes a power-of-two encoded mapping of a concatenation of the child node information with a similarly encoded mapping of respective information of child nodes thereof. In some variations, the order-insensitive collapsing includes an arithmetic sum of orthogonal binary encodings of child node information. In some variations, distinct tables are defined for each level of the hierarchically-organized data structure, whereas in others, a table spans multiple levels of the hierarchically-organized data structure.

In another embodiment in accordance with the present invention, a method of identifying equivalent logical subtrees of a tree-oriented data representation includes associating a first-level identifier with each of plural leaf nodes at a first-level of the tree, wherein distinct leaf node values are associated with distinct first identifiers and equivalent leaf node values are associated with same first identifiers, and at each next level of the tree, associating an identifier with each node thereof, each such identifier including a current node contribution and a contribution associated with any child nodes thereof. The child nodes contribution is computed using a combining function operative on identifiers associated with the child nodes. Suitable identifiers and combining function(s) are selected to ensure that same combinations of child node identifiers result in same child nodes contributions irrespective of ordering of the child node identifiers. For a second level of the tree, respective child nodes are the leaf nodes of the first-level of the tree. In some variations, the identifiers are orthogonally-encoded mappings of respective string encodings of the current node contribution concatenated with respective orthogonally-encoded mappings of child node information. In various realizations, the method is employed in (a) a duplicate elimination operation on the tree-oriented data representation, (b) a duplicate identification operation on the tree-oriented data representation and/or (c) an equality test operation on portions of the tree-oriented data representation.

In yet another embodiment in accordance with the present invention, a method of representing hierarchically-organized data includes recursively collapsing sub-hierarchies thereof using encodings that, at least at a same level thereof, include orthogonal values and representing any given node of the hierarchically-organized data as a concatenation of node-specific information with a combination of the orthogonal values for each collapsed sub-hierarchy therebeneath.

In still yet another embodiment in accordance with the present invention, a computer program product is encoded in at least one computer readable medium. The computer program product includes a program sequence including a recursively called set of instructions executable by one or more processors to operate on at least one instance of an hierarchically-organized data structure. The instructions, when executed, cause the processor to define a counterpart data structure by collapsing plural nodes of the hierarchically-organized data structure into respective representations that each incorporate information of a respective node and that of any child nodes thereof, wherein the collapsing includes an order-insensitive aggregation of orthogonal encodings of information of the respective child nodes. The computer program product also includes an object implementing the counterpart data structure including at least one table wherein values thereof provide the orthogonal encodings and keys thereof combine the information of respective nodes with an aggregation of the collapsed representations for child nodes thereof.

In still yet another embodiment in accordance with the present invention, an information management tool includes software executable by one or more processors. In particular, the information management tool includes an encoding of a hierarchically-organized data structure instantiable in memory addressable by the one or more processors and instructions executable thereby to operate on at least one instance of the hierarchically-organized data structure instantiated in memory. The instructions, when executed, cause the processor to define a counterpart data structure in the memory by collapsing plural nodes of the hierarchically-organized data structure into respective representations that each incorporate information of a respective node and that of any child nodes thereof, wherein the collapsing includes an order-insensitive aggregation of orthogonal encodings of information of the respective child nodes. In some variations, the information management tool includes matching instructions executable by the one or more processors to identify distinct sub-hierarchies of the hierarchically-organized data structure as at least equivalent based on correspondence of the collapsed representations.

These and other embodiment will be understood in the context of the description and claims that follow.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Systems, structures and techniques described herein provide a mechanism for transforming, representing and/or manipulating hierarchically-organized data in a way that efficiently identifies and/or encodes identical or equivalent instances. In this way, applications and other software systems that efficiently handle such data organizations are facilitated. Trees (typically implemented as a hierarchy of nodes traversed using pointer chains) are but one example of a hierarchically-organized data structure. In particular, persons of ordinary skill in the art will recognize that other encodings may be hierarchical in organization. For example, without limitation serialized or string encodings may exhibit hierarchical organization. In particular, both information encoded using markup languages (e.g., XML) and information encoded as lists of lists often exhibit hierarchical organization. Although the description that follows employs illustrative hierarchical data organizations that may resemble traditional, pointer traversed tree structure of nodes, persons of ordinary skill in the art will recognize that such data organizations and associated encodings and operations are merely illustrative and the scope of the present invention is not limited thereto. Computer program products may be encoded in one or more computer readable media selected from the set of a disk, tape, or other magnetic, optical and electronic storage medium. Such products may also be encoded for transmission in a network, wireline, wireless, or other communications medium.

In view of the above, and without limitation, particular data structure encodings of information associated with hypothetical hierarchically decomposed computational systems are now introduced. Consider two items as follows:

Item 1: Assembly A1
  1 Card cage type C1
    Ethernet card type ET1
    ATM adapter type ATM1
    SCSI adapter type SCSI1
  1 Disk cage type D1
    2 9 Gb hard disks type HD9
    1 36 Gb hard disk type HD36
    1 DVD-ROM drive type DVD1
Item 2: Assembly A1
  1 Disk cage type D1
    1 DVD-ROM drive type DVD1
    1 9 Gb hard disk type HD9
    1 36 Gb hard disk type HD36
    1 9 Gb hard disk type HD9
  1 Card Cage type C1
    1 SCSI adapter type SCSI1
    1 ATM adapter type ATM1
    1 Ethernet adapter type ET1

Figure 1:
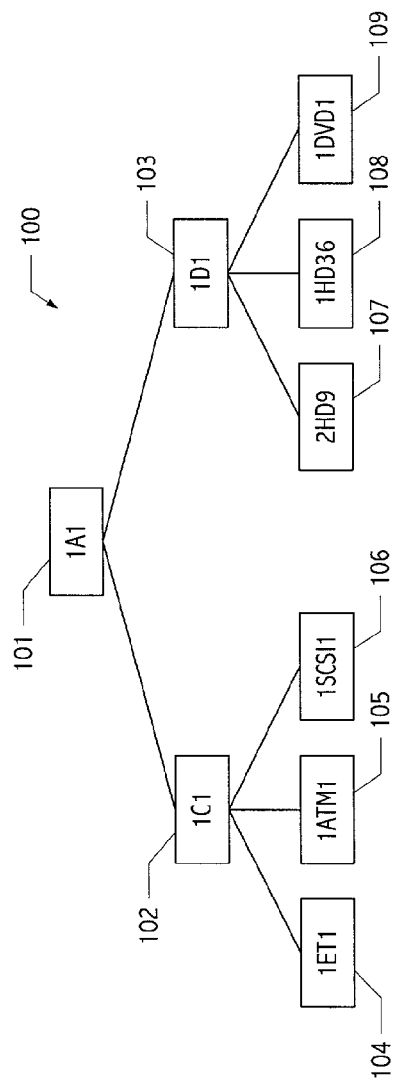
FIG. 1 depicts a view of a hierarchically-organized data structure that encodes data representations corresponding to sub-assemblies and components of a first system.

FIG. 1 depicts a view of an hierarchically-organized data structure 100 that encodes data representations corresponding to item 1. For example, information encoded in hierarchically-organized data structure 100 includes a node encoding 101 of information associated with an assembly of type A1 and respective node encodings 102, 103 of information associated with two subsystems thereof, namely a card cage of type C1 and a disk cage of type D1. The card cage includes components of the following types: an Ethernet adapter ET1, an asynchronous transfer mode adapter ATM1 and a SCSI adapter SCSI1. Similarly, the disk cage includes components of the following types: two 9 GByte disks HD9, a 36 GByte disk HD36 and a DVD-ROM drive DVD1. Accordingly, hierarchically-organized data structure 100 includes a corresponding node encodings 104, 105, 106, 107, 108 and 109 of associated information.

Figure 2A:
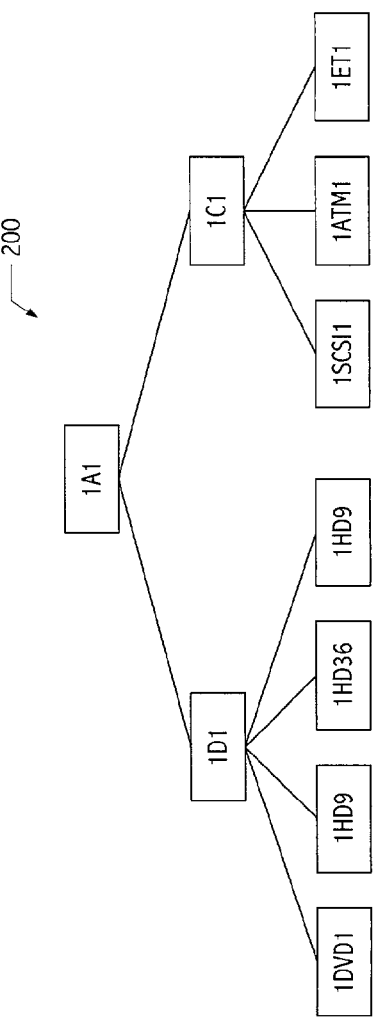
FIGS. 2A and 2B depict views of hierarchically-organized data structures that encode data representations corresponding to sub-assemblies and components of a second system. The hierarchically-organized data structure of FIG. 2B is a transformation of that depicted in FIG. 2A wherein multiple instances of like components are reduced into a single node representation that encodes quantity.

FIG. 2A depicts another data structure instance 200 that encodes information corresponding to item 2. On inspection, it will be apparent that despite a slightly different structure and node encodings, data structure 200 encodes information for a system that contains sets of subsystems and components thereof, which are identical to those represented in data structure 100. In particular, the systems represented by both data structures each include a single instance of a card cage of type C1 and a single instance of a disk cage of type D1. Each instance of a C1 type card cage includes one instance each of an ET1-type Ethernet adapter, a SCSI1-type SCSI adapter and an ATM1-type asynchronous transfer mode adapter. Similarly, each instance of a D1-type disk cage includes two instances of an HD9-type disk and one instance each of an HD36-type disk and a DVD1-type DVD-ROM drive.

Figure 2B:
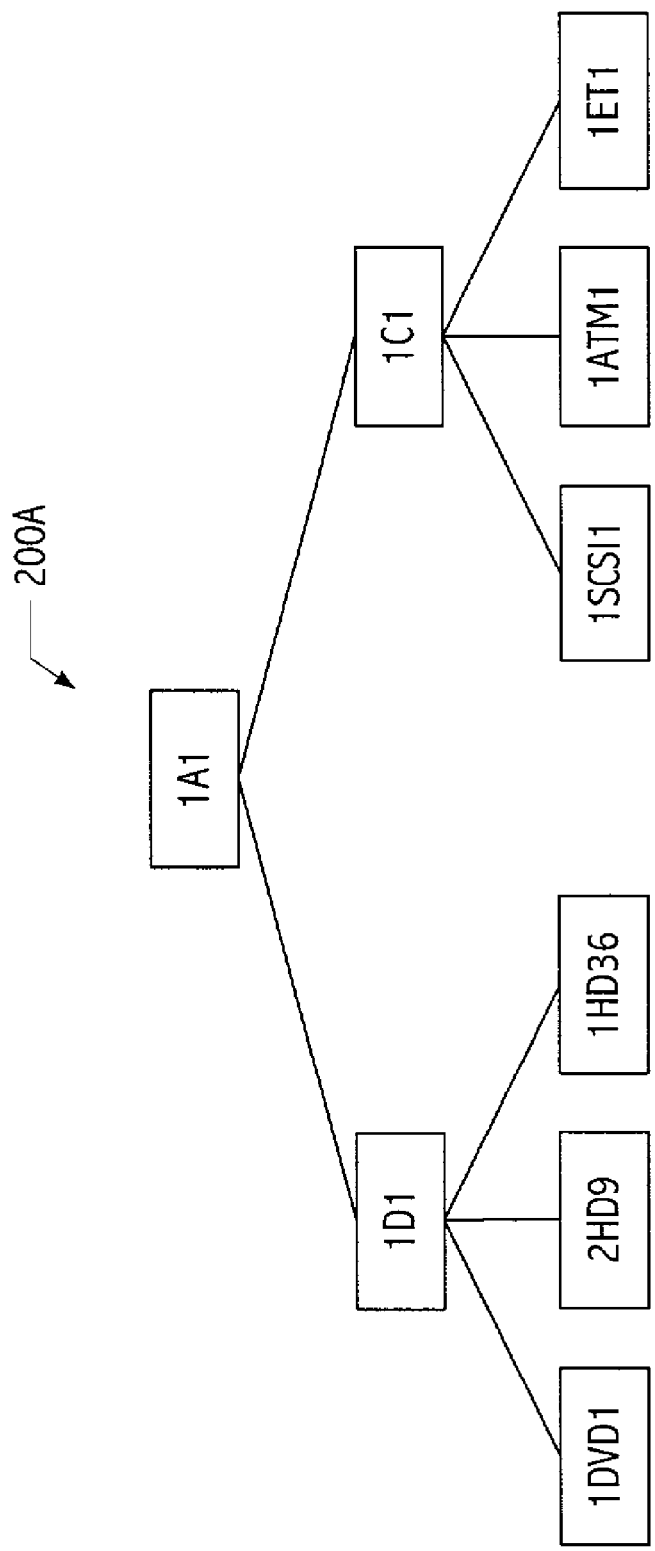

Accordingly, data structure instances 100 and 200 serve as a useful illustrative context for description of some exploitations of the present invention. The hierarchically-organized data structure 200A depicted in FIG. 2B is a transformation of that depicted in FIG. 2A, wherein multiple instances of like components are reduced into a single node representation that encodes quantity. For many software applications, an efficient method for identification that data structures 100 and 200 (or 200A) are equivalent, i.e., that they represent identical systems though with somewhat different internal referencing chains, can be quite useful. Similarly, transformations or encodings that facilitate such comparison are also quite useful. An illustrative approach based on a recursive application of a particular orthogonal encoding technique will be understood in the context of FIGS. 3–6.

While persons of ordinary skill in the art will recognize the correctness of distinguishing between a particular data encoding, e.g., a node of tree-oriented data structure, and the item, information unit or component to which it corresponds, such technical distinctions may interfere with a useful description. In this regard, persons of ordinary skill in the art will also understand the use of labels as shorthand. Accordingly, in the description that follows, we use notation such as node 2HD9 as shorthand for a data structure encoding of information associated with two instances of a particular 9 MByte disk. The description and figures that follow will be understood in this regard.

A basic technique in accordance with some embodiments of the present invention includes, for each node in the tree, building a string representation of the node that incorporates information about the node itself plus information about its children, without regard to the order of the children. The basic technique may be employed in the context of tree or sub-tree comparisons, as a precursor to such comparison or as an encoding or transformation technique for tree-oriented data. In the examples that follow, a mapping function is employed to associate each such string representation with a code or key. In general the mapping has the attributes that identical source information maps to identical code or key values and non-identical source information maps to distinct code or key values. In addition, distinct values so-mapped have the general property that, when considered in the context of a combining operation, they are orthogonally-encoded. Stated differently, the results of such a combining operation performed on first and second sets of values is not the same, unless membership in the two sets is identical, and a result of the combining operation is insensitive to order of operands.

In some implementations, a programming infrastructure is employed, which is more generally associated with hash table implementations. In such implementations, the hashing function employed provides a mapping in which identical source information maps to identical values and in which non-identical source information maps to distinct values. Of course, any technique that provides a mapping between an aggregation of child node information and an orthogonally-encoded value is suitable. Other table access, value encoding and mapping techniques may be employed. Nonetheless, for ease of illustration, terminology appropriate to a hash table implementation is used throughout.

One use for hash table techniques is in duplicate removal. In particular, once we have such a string representation for each child node of a parent node P, then we can sequentially step through the child nodes, looking for the string representation S of each child C in a hash table (e.g., a hash table in accordance with the Java "Hashtable" class) that maps string representations to a corresponding child node of the parent. If we do not find S as a key in the hash table, then C is a unique child node, so we place S in the hash table as a key with the associated value being C. If we do find S as a key in the hash table, then C is a duplicate of the node that is the value for key S, so we increment the quantity of that target node by the quantity of C and delete C from the parent P. Such a facility may be employed to identify multiple instances of identical nodes (e.g., as shown in the transition from FIGS. 2A to 2B).

Another use of hash table techniques is in an implementation of the mappings described above. For example, to generate a string representation of any parent node that ignores ordering of child nodes, we generate a mapping that takes string representations of the child nodes and encodes them in a form that, when combined, results in the same value regardless of order of combination. In one realization, this goal is achieved by having each string representation assigned a unique bit within an arbitrarily-long binary number, and then adding these unique bits for all the child nodes to achieve a hash code which has a bit set for each string representation present. This hash code can then be incorporated into the string representation of the parent node along with information unique to the parent node. To guarantee uniqueness, we record the hash values for each string representation in a hash table (e.g. the Java "Hashtable" class) with the key being the string representation and the value being the hash value. Whenever we come across a string representation that is not in the hash table, we add it as a new key, with the value being 2 raised to a power equal to the size of the hash table. This approach provides orthogonality of encodings.

Figure 3:
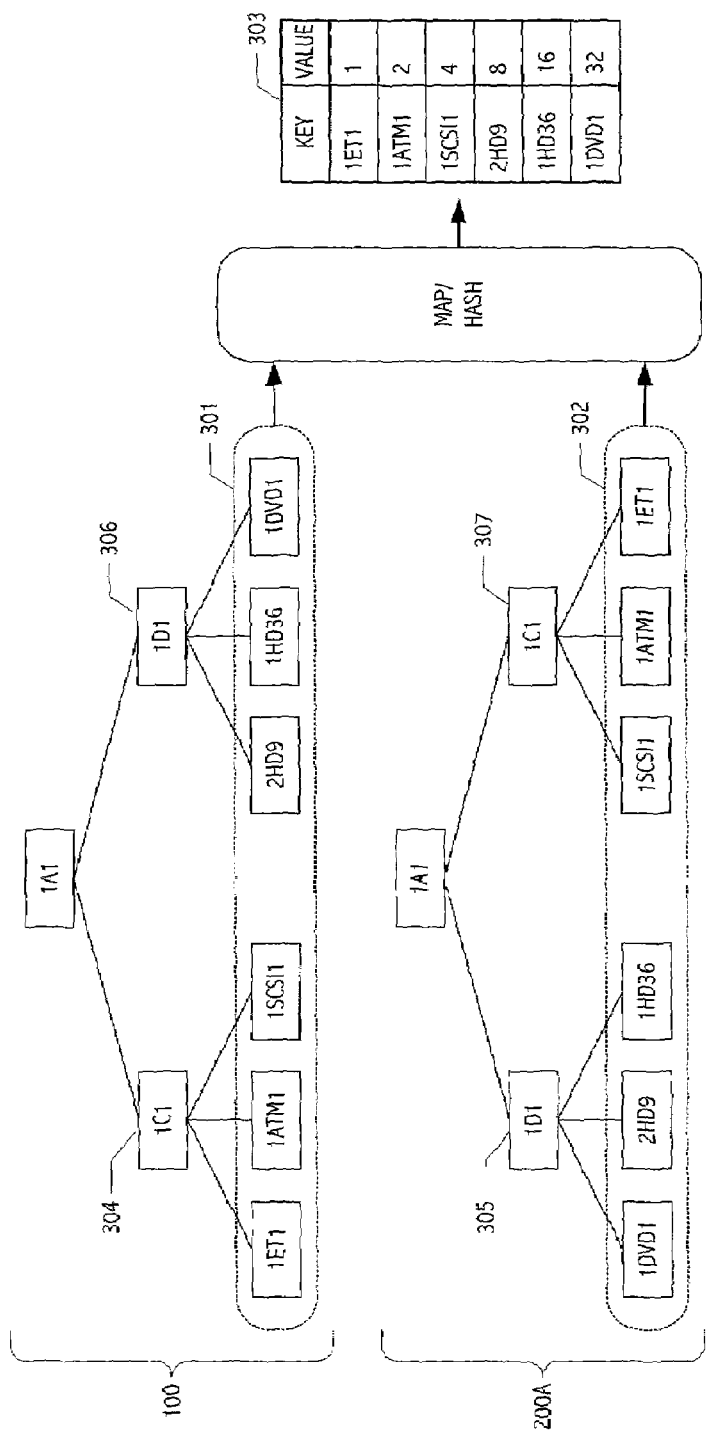
FIG. 3 depicts operations in accordance with some embodiments of the present invention wherein leaf nodes of two hierarchically-organized data structures are mapped to a set of power-of-two encoded values.

FIG. 3 illustrates the above-described technique applied to leaf nodes 301, 302 of respective data structures 100 and 200A. As applied to leaf nodes 301 of data structure 100, power-of-two encoded values are associated with leaf node contents. Although key/value pairs are assigned according to the left-to-right presentation of the leaf nodes, assignment order is arbitrary. Turning to data structure 200A, a corresponding entry (i.e., key and value) is found for each leaf nodes 302 thereof. Accordingly, no new entries need by allocated if, and when, the above-described technique is also applied to leaf nodes 302.

Figure 4:
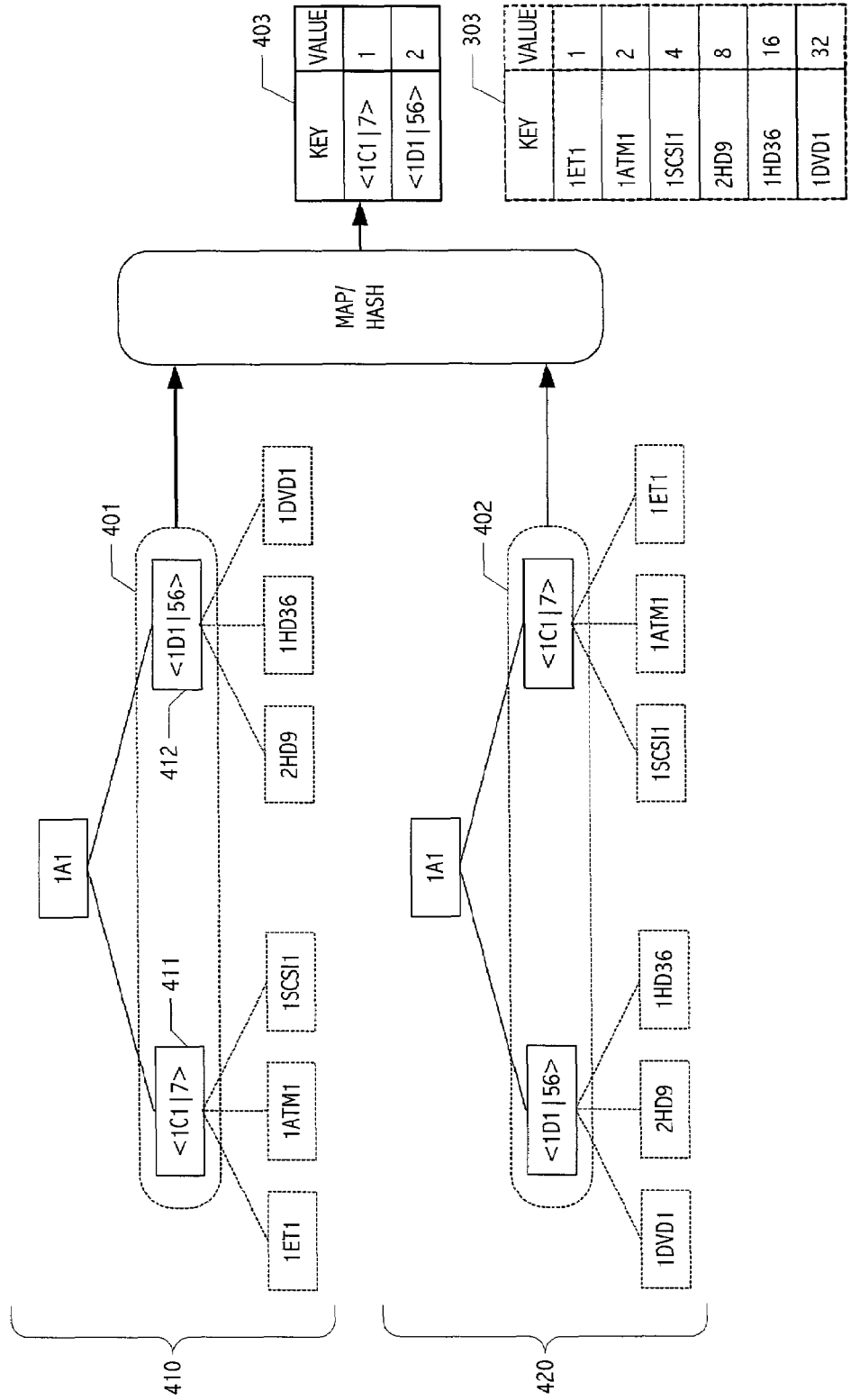
FIG. 4 depicts operations in accordance with some embodiments of the present invention wherein intermediate nodes of two hierarchically-organized data structures are mapped to a set of power-of-two encoded values.

FIG. 4 illustrates operation of the above-described technique at a next level of the illustrated data structures. In particular, information from nodes 304 and 306 (see FIG. 3) is aggregated with information from respective leaf nodes thereof. In particular, the aggregated information is shown in FIG. 4 collapsed into respective nodes 411 and 412. In particular, the collapsed form illustrated includes a concatenation of string encoded information associated with the corresponding node (illustrated in FIG. 3) with a string encoding of the arithmetic sum of orthogonally-encoded values for child nodes. Note that, string encodings are but one suitable design choice. More generally, suitable encodings preserve the property that, when aggregated with identical node information, identical sets of child nodes (including child nodes that themselves contain collapsed information) map to identical collapsed node encodings without regard to ordering of the child nodes. In some applications, reversibility of the encoding is desirable so that collapsed forms can be employed to regenerate the full tree. In the illustration of FIG. 4, collapsed node encodings include various delimiters (e.g., <, | and >) that enhance readability, but which need not be employed in any particular implementation.

As applied to nodes 304 and 306 (see FIG. 3) of data structure 100, power-of-two encoded values for respective child nodes are arithmetically combined and then concatenated with node information. In particular, collapsed node encoding 411, <1C|7>, includes a concatenation of node information, 1C1, with an arithmetic sum of the previously mapped orthogonal encodings for respective child nodes (7=1+2+4). Similarly, collapsed node encoding 412, <1D1|56>, is a concatenation of node information, 1D1, with an arithmetic sum of the previously mapped orthogonal encodings for respective child nodes (56=8+16+32). Collapsed node encodings for nodes of data structure 200A are similar and are illustrated in the form of data structure 420. Encodings for leaf node information suitable for both data structure 410 and 420 are represented in table 303.

As before, power-of-two encoded values are associated with node contents according to a mapping. In the realization of FIG. 4, a new table 403 is allocated to represent information at level 401 of data structure 410. In the illustration, a corresponding entry (i.e., key and value) is found for level 402 node of data structure 420 thereof. Accordingly, no new entries need to be allocated if, and when, the above-described technique is also applied to nodes at level 402 of data structure 420.

Figure 5:
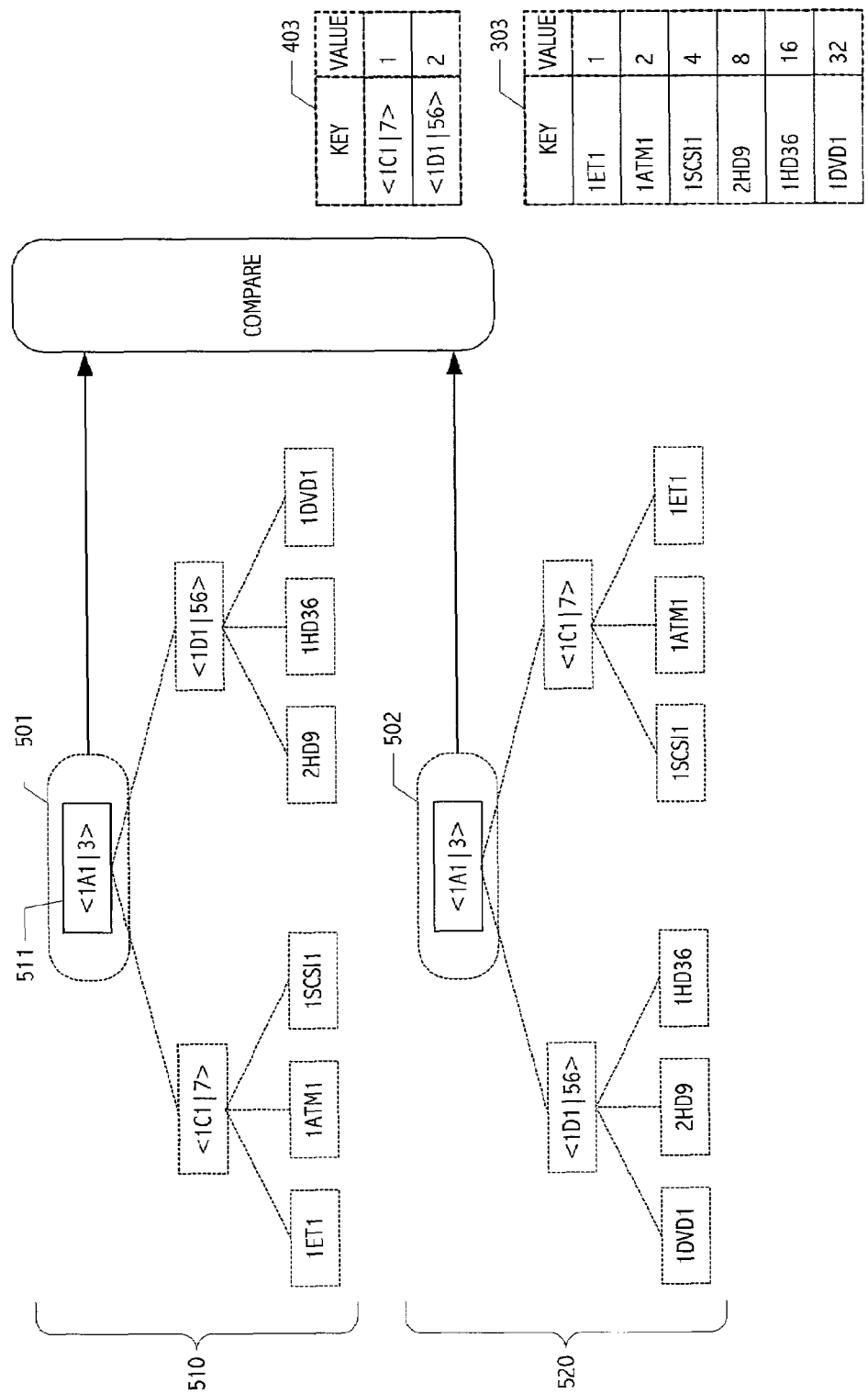
FIG. 5 depicts operations in accordance with some embodiments of the present invention wherein root nodes that include an orthogonal combination of power-of-two encoded hashes of sub-hierarchies therebelow are compared to establish identity or equivalence of a pair of hierarchically-organized data structures.

FIG. 5 illustrates application of the above-described techniques at a third and apex level (501, 502) of data structures 510 and 520 that correspond to original data structures 100 and 200A. As before, power-of-two encoded values for respective child nodes are arithmetically combined and then concatenated with node information. In particular, collapsed node encoding 511, <1A1|3>, includes a concatenation of node information, 1A1, with an arithmetic sum of the previously mapped orthogonal encodings for respective child nodes (3=1+2). A collapsed node encodings at level 502 of data structure 520 is similar. Encodings for levels of child node information suitable for both data structure 510 and 520 are represented in tables 403 and 303.

Figure 8:
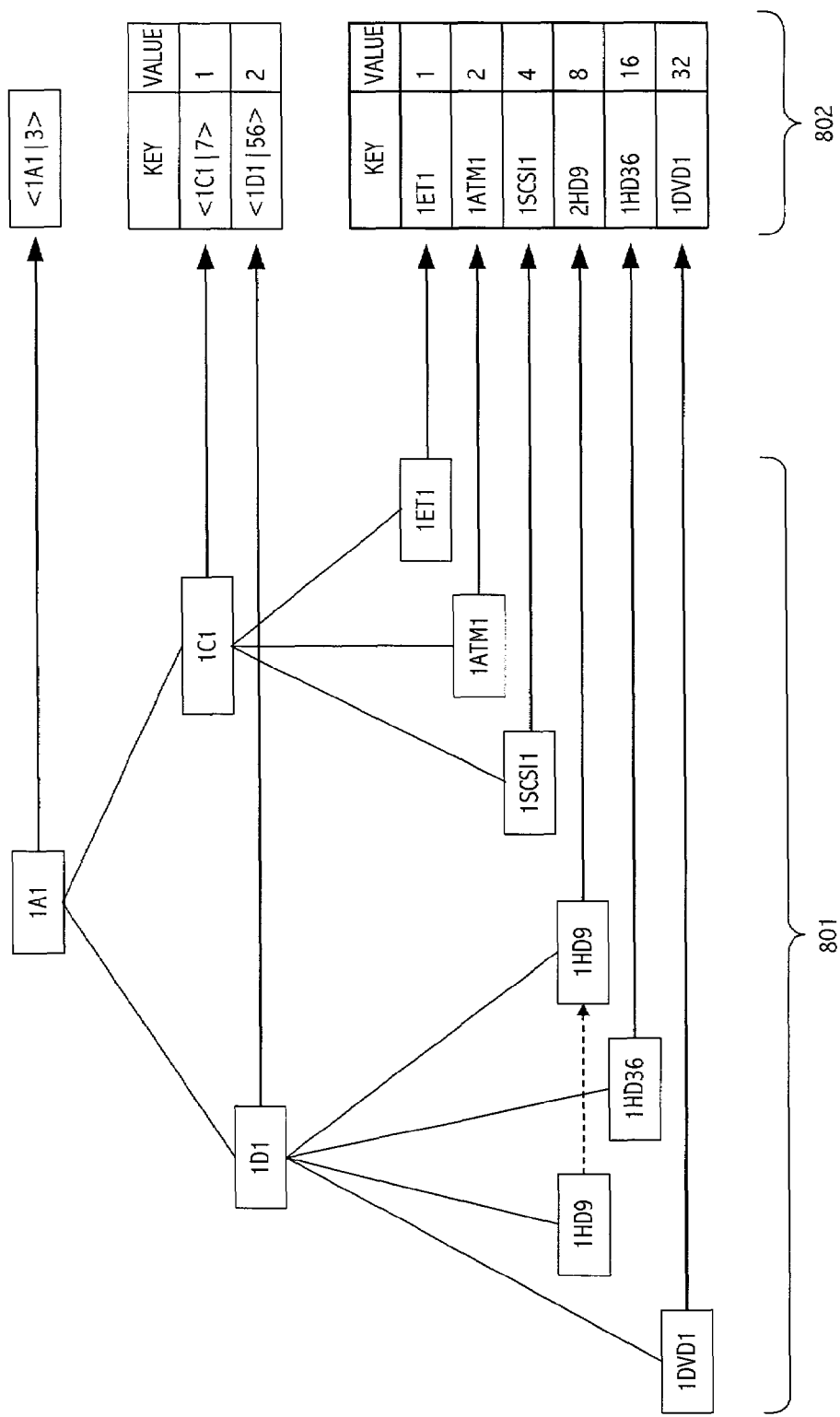
FIG. 8 depicts an exemplary transformation of a hierarchically-organized data structure in accordance with some embodiments of the present invention.

On comparison, it is apparent that collapsed encodings 501 and 502 are identical. Accordingly, the hierarchies (or sub-hierarchies) of information represented by data structures 100 and 200A are themselves identical when evaluated without regard to ordering of child nodes. Persons of ordinary skill in the art will appreciate that, while FIGS. 3, 4 and 5 illustrate application of techniques in accordance with the present invention to both data structures 100 and 200A, such techniques may, in some exploitations be applied to one or the other data structure. Furthermore, the collapse of node information may be performed in situ or in the context of a separate resultant encoding. In some exploitations, collapse may obviate continued storage of the sub-hierarchies below. As illustrated in FIG. 8, some exploitations of the described techniques may provide a transformation from one representation (e.g., from a traditional tree-oriented representation such as representation 801 to a collapsed, table-encoded representation such as representation 802).

Based on the above, persons of ordinary skill in the art will recognize that there is possibility of an arbitrarily large number of string representations in any tree, more than could be represented in even a 64-bit value. As a technique to avoid this limit, we can use an integer implementation that allows arbitrary precision (for example, in the Java language, the BigInteger class provides numbers that can be arbitrarily large and yet maintain exact precision). Another useful dynamic range management technique was employed in illustrations of FIGS. 3, 4 and 5. In the above illustrations, separate mapped representations (e.g., tables 303 and 403) were prepared at individual levels of the hierarchies. This decomposition has the effect of reducing the demands on integer representations. In the illustration of FIGS. 3, 4 and 5, we only care about directly comparing nodes that are at the same level of the tree. As long as we have a string representation that is guaranteed unique for all nodes at the same level, then this scheme works. Accordingly, each level of a tree corresponds a table that holds codes for comparing nodes at that level. This limits the number of bits needed to the maximum number of unique nodes at any level of the tree.

There is another consideration for efficient implementation of this algorithm. The use of hash tables means that searches for string representations are constant time, but only as long as each table has a sufficient number of "buckets" to contain all the references that will be stored there. For example, assume a hash table is created with only 20 buckets, and we end up with 1000 strings being stored there. Then the search for any one string will require stepping through and comparing, on average, 25 entries (1000/20=average chain length per bucket of 50, divided by 2 to get the average number of items to be stepped through on any one search). So, if the initial size of the hash table is too small, the searches for individual strings becomes linear, and the overall algorithm ends up with running time $O(N^2)$. Thus, hash table sizes should be tuned for the expected size of the input.

For example, assume that we have two trees that describe subassemblies of a machine that is being configured. If the two subassemblies are identical in parts content, regardless of the order in which they were selected originally, then we want to combine them into a single tree with quantity 2. This would indicate that we have two identical subassemblies in the configuration.

Figure 6:
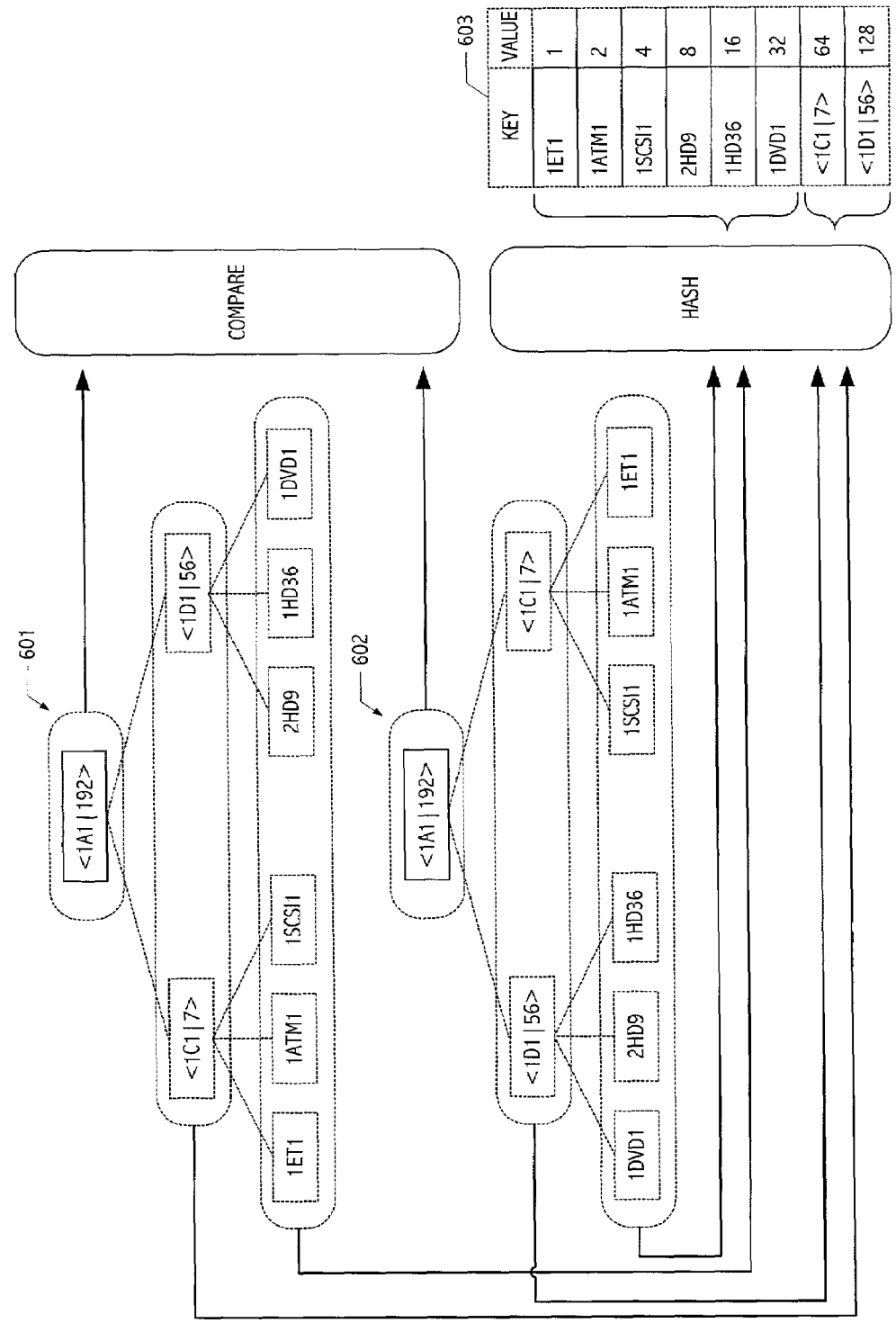
FIG. 6 depicts operations in accordance with some embodiments of the present invention wherein hashed node encodings corresponding to multiple levels of a hierarchically-organized data structure are represented in a single mapping table.
Figure 7:
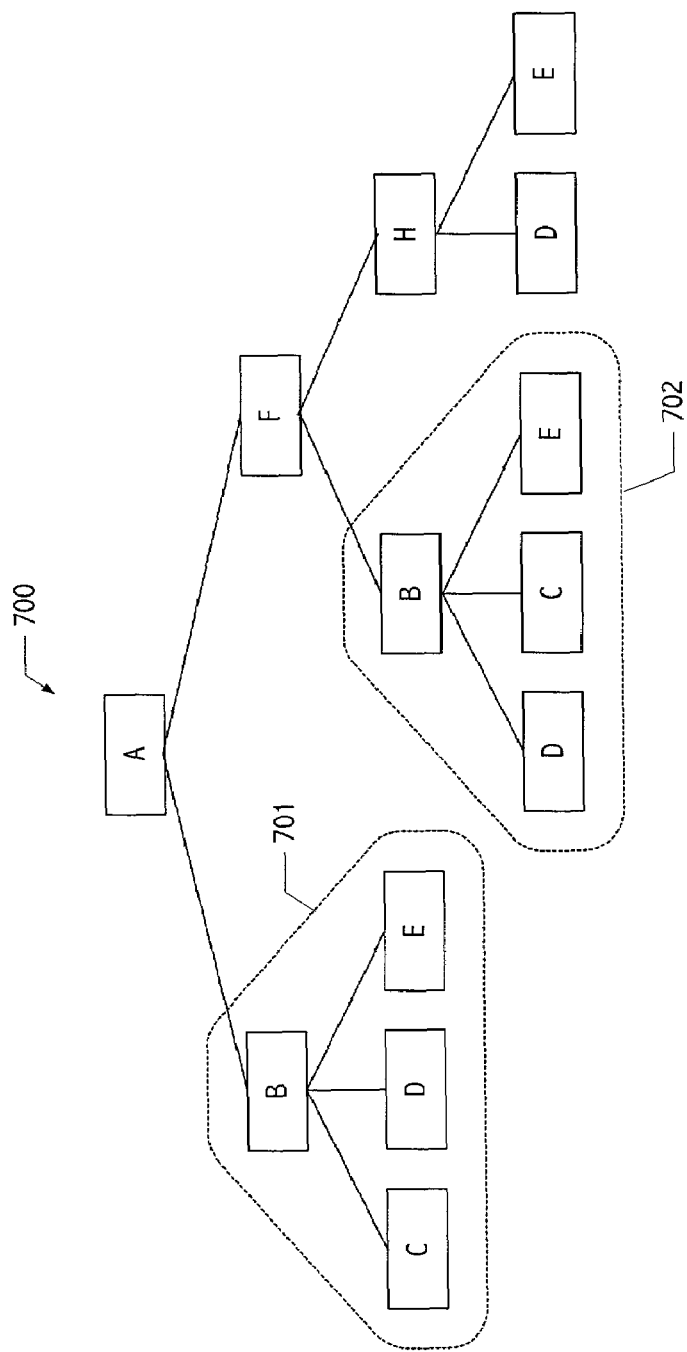
FIG. 7 depicts sub-hierarchies at differing levels of a hierarchically-organized data structure, for which collapsing and/or comparison operations may be performed in accordance with some embodiments of the present invention.

While the illustration of FIGS. 3, 4 and 5 has certain advantages with respect to dynamic range of orthogonally-encoded values, some realizations may benefit from a variation that facilitates identification of identical sub-trees that have an apex at different levels of one or more hierarchies. FIG. 7 illustrates a tree structure 700 in which identical sub-trees 701 and 702 appear at different levels. A variation on the technique previously described facilitates detection of such sub-trees. Although data structures 100 and 200A do not include a pair of identical sub-trees that apex at different levels, the variation will nonetheless be understood in the context thereof. Referring now to FIG. 6, instead of maintaining separate tables for each level, a combined table 603 is maintained. As a result, identical sub-trees resolve to single entry in table 603 regardless of the level at which they apex. Although the particular mapping differ from those illustrated with respect to FIGS. 3, 4, and 5, the new mappings exhibit the same characteristics and, as before, the collapsed representations, <1A1|192>, of the two trees 601 and 602 are matched and therefore indicate equivalence. Of course the approach of FIG. 6 may be combined with that described above with reference to FIGS. 3, 4, and 5. In particular, some levels may be represented using respective single-level tables, while other levels of the same hierarchy may share a table representation.

OTHER EMBODIMENTS

While the invention has been described with reference to various embodiments, it will be understood that these embodiments are illustrative and that the scope of the invention is not limited to them. Many variations, modifications, additions, and improvements are possible. In particular, a wide variety of hierarchically-organized data encodings are possible. For example, in addition to traditional pointer traversed hierarchies of nodes, other encodings, including those based on markup languages may be operated upon using the techniques described herein. While the present invention is not limited to XML encodings, persons of ordinary skill in the art will appreciate applications of the techniques described herein to XML-encoded hierarchies such that that below.

```
<instances>
    <pcmproductinst uniquename="456">
        <attributes>
            <attrval name="description_tdg" value="Part B"/>
            <attrval name="partnumber_tdg" value="456"/>
            <attrval name="quantity_tdg" value="1" type="float"/>
            <attrval name="type_tdg" value="pcmproductinst"/>
        </attributes>
        <instances>
            <sbcompinst uniquename="456B1">
                    <discriminators>
                        <attr name="weight"/>
                        <attr name="height"/>
                    </discriminators>
                <attributes>
                    <attrval name="partnumber_tdg" value="456B1"/>
                    <attrval name="description_tdg" value="Part B subpart 1"/>
                    <attrval name="quantity_tdg" value="5.0" type="float"/>
                    <attrval name="weight" value="150 g"/>
                    <attrval name="height" value="30 mm"/>
                    <attrval name="depth" value="40 mm"/>
                </attributes>
            </sbcompinst>
            <sbcompinst uniquename="456B2">
                    <discriminators>
                        <attr name="weight"/>
                        <attr name="depth"/>
                    </discriminators>
                <attributes>
                    <attrval name="partnumber_tdg" value="456B2"/>
                    <attrval name="description_tdg" value="Part B subpart 2"/>
                    <attrval name="quantity_tdg" value="6" type="float"/>
                    <attrval name="weight" value="350 g"/>
                    <attrval name="height" value="40 mm"/>
                    <attrval name="depth" value="60 mm"/>
                </attributes>
```

-continued

```
                </sbcompinst>
            </instances>
        </pcmproductinst>
        <pcmproductinst uniquename="789">
            <attributes>
                <attrval name="partnumber_tdg" value="789"/>
                <attrval name="description_tdg" value="Part X"/>
                <attrval name="quantity_tdg" value="2" type="float"/>
            </attributes>
            <instances>
                <sbcompinst uniquename="789B1">
                        <discriminators>
                            <attr name="weight"/>
                            <attr name="height"/>
                        </discriminators>
                    <attributes>
                        <attrval name="partnumber_tdg" value="789B1"/>
                        <attrval name="description tdg" value="Part X subpart 1"/>
                        <attrval name="quantity_tdg" value="5" type="float"/>
                        <attrval name="weight" value="150 g"/>
                        <attrval name="height" value="30 mm"/>
                        <attrval name="depth" value="40 mm"/>
                    </attributes>
                </sbcompinst>
                <sbcompinst uniquename="789B2">
                        <discriminators>
                            <attr name="weight"/>
                            <attr name="depth"/>
                        </discriminators>
                    <attributes>
                        <attrval name="partnumber_tdg" value="789B2 "/>
                        <attrval name="description_tdg" value="Part X subpart 2"/>
                        <attrval name="quantity_tdg" value="6" type="float"/>
                        <attrval name="weight" value="350 g"/>
                        <attrval name="height" value="40 mm"/>
                        <attrval name="depth" value="60 mm"/>
                    </attributes>
                </sbcompinst>
            </instances>
        </pcmproductinst>
        <pcmproductinst uniquename="456">
            <attributes>
                <attrval name="partnumber_tdg" value="456"/>
                <attrval name="description_tdg" value="Part B"/>
                <attrval name="quantity_tdg" value="2" type="float"/>
            </attributes>
            <instances>
                <sbcompinst uniquename="456B1">
                        <discriminators>
                            <attr name="weight"/>
                            <attr name="height"/>
                        </discriminators>
                    <attributes>
                        <attrval name="partnumber_tdg" value="456B1"/>
                        <attrval name="description_tdg" value="Part B subpart 1"/>
                        <attrval name="quantity_tdg" value="5" type="float"/>
                        <attrval name="weight" value="150 g"/>
                        <attrval name="height" value="30 mm"/>
                        <attrval name="depth" value="150 mm"/>
                    </attributes>
                </sbcompinst>
                <sbcompinst uniquename="456B2">
                        <discriminators>
                            <attr name="weight"/>
                            <attr name="depth"/>
                        </discriminators>
                    </attributes>
                        <attrval name="partnumber_tdg" value="456B2"/>
                        <attrval name="description_tdg" value="Part B subpart 2"/>
                        <attrval name="quantity_tdg" value="6" type="float"/>
                        <attrval name="weight" value="350 g"/>
                        <attrval name="height" value="120 mm"/>
                        <attrval name="depth" value="60 mm"/>
                    </attributes>
                </sbcompinst>
            </instances>
        </pcmproductinst>
</instances>
```

Using techniques described herein such an XML representation may be reduced to a form that collapses duplicates or may be compared (in whole or in part) to other hierarchies.

Furthermore, while certain illustrative orthogonal encodings and aggregation operations have been illustrated, persons of ordinary skill in the art will appreciate a variety of alternatives based on the description herein. Use of hash table infrastructure and Java BigInteger constructs in some implementations is purely a matter of convenience. Additionally, while hierarchical decompositions of physical systems have been used as an exemplary context, applications of the present invention are not limited thereto. Indeed, the present invention may be employed in the context of representation and/or presentation of information organizations, such as for directory structures, registry information and/or parse trees.

More generally, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete in the exemplary configurations may be implemented as a combined structure or component. These and other variations, modifications, additions, and improvements may fall within the scope of the invention as defined in the claims that follow.

What is claimed is:

1. A computer implemented method of identifying equivalent portions of one or more unsorted hierarchically-organized data structures, the method comprising:
    collapsing plural nodes of the one or more unsorted hierarchically-organized data structures into respective representations, wherein each of the respective representations incorporate information of a respective node and information of any child nodes of the respective node; and
    based on correspondence of particular instances of the collapsed representations, identifying the respective portions as equivalent,
    wherein the collapsing is order-insensitive with respect to information of the respective child nodes,
    wherein the collapsed representations include respective aggregations of orthogonally-encoded child node information.

2. A method as recited in claim 1,
    wherein a unit of orthogonally-encoded child node information includes a power-of-two encoded mapping of a concatenation of the child node information with a similarly encoded mapping of respective information of child nodes thereof.

3. A method as recited in claim 1,
    wherein a unit of orthogonally-encoded child node information includes a power-of-two encoded mapping of a concatenation of the child node information with recursively encoded mappings of respective sub-hierarchies thereof.

4. A method as recited in claim 1,
    wherein the order-insensitive collapsing includes an arithmetic sum of orthogonal binary encodings of child node information.

5. A method as recited in claim 1,
    wherein distinct tables are defined for each level of the hierarchically-organized data structure.

6. A method as recited in claim 1,
    wherein a table spans multiple levels of the hierarchically-organized data structure.

7. A method as recited in claim 1, wherein, at a particular node of the hierarchically-organized data structure, the order-insensitive collapsing includes:
    an arithmetic addition of orthogonal binary encodings that identify corresponding table entries for respective child nodes; and
    concatenation of a result of the arithmetic addition with an encoding of information for the particular node.

8. A method as recited in claim 7,
    wherein the order-insensitive collapsing at the particular node further includes creating a new mapping of the concatenation, the new mapping being an encoding that is at least orthogonal with that for any other node at a same level of the hierarchically-organized data structure.

9. A method as recited in claim 7,
    wherein the order-insensitive collapsing at the particular node further includes creating a new mapping of the concatenation, the new mapping being an encoding that is orthogonal with that for any other node of the hierarchically-organized data structure.

10. A method as recited in claim 7,
    wherein the encoding of particular node information is a string encoding thereof.

11. A method as recited in claim 7,
    wherein the hierarchically-organized data structure includes at least two levels.

12. A method as recited in claim 1,
    wherein the correspondence of particular instances of the collapsed representations is based on identity of respective mapped codes.

13. A method as recited in claim 1,
    wherein the order-insensitive collapsing includes an arithmetic addition of orthogonally-encoded values that index into a store of child node information.

14. A method as recited in claim 1,
    wherein the hierarchically-organized data structure includes at least three levels of nodes; and
    further comprising performing the collapsing at successive ones of the levels of the hierarchically-organized data structure.

15. A method as recited in claim 1,
    wherein the hierarchically-organized data structure includes a tree-organized data structure.

16. A method as recited in claim 1,
    wherein the hierarchically-organized data structure encodes subassembly information as sub-hierarchies thereof and encodes component parts at least at leaf nodes thereof.

17. A computer implemented method of identifying equivalent logical sub-trees of a tree-oriented data representation, the method comprising:
    associating a first-level identifier with each of plural leaf nodes at a first-level of the tree, wherein distinct leaf node values are associated with distinct first identifiers and equivalent leaf node values are associated with same first identifiers; and
    at each next level of the tree, associating an identifier with each node of a respective level, each such identifier including a current node contribution and a contribution associated with any child nodes of the current node, wherein the child nodes contribution is computed using a combining function operative on identifiers associated with the child nodes, wherein the identifiers and combining function are selected to satisfy orthogonality, wherein the selected identifiers and combining function ensure that same combinations of child node identifiers result in same child nodes contributions irrespective of ordering of the child node identifiers, and wherein for a second level of the tree, respective child nodes are the leaf nodes of the first-level of the tree.

18. A method as recited in claim 17, wherein the identifiers are orthogonally-encoded mappings of respective string encodings of the current node contribution concatenated with respective orthogonally-encoded mappings of child node information.

19. A method as recited in claim 18, wherein the orthogonally-encoded mappings at each level of the tree-oriented data representation are in accordance with a corresponding level-specific table.

20. A method as recited in claim 18, wherein the orthogonally-encoded mappings for distinct portions of the tree-oriented data representation are in accordance with respective tables.

21. A method as recited in claim 18, wherein the orthogonally-encoded mappings for multiple levels of the tree-oriented data representation are in accordance with a single corresponding hash table.

22. A method as recited in claim 18, wherein the orthogonally-encoded mappings for each level of the tree-oriented data representation are in accordance with a single corresponding table.

23. A method as recited in claim 17, wherein, at least at any particular level of the tree-oriented data representation, the identifiers are orthogonally-encoded.

24. A method as recited in claim 17, wherein the identifiers correspond to orthogonal binary encodings of integers; and wherein the combining function includes addition.

25. The method of claim 17, employed in a duplicate elimination operation on the tree-oriented data representation.

26. The method of claim 17, employed in a duplicate identification operation on the tree-oriented data representation.

27. The method of claim 17, employed in an equality test operation on portions of the tree-oriented data representation.

28. A computer implemented-method of representing hierarchically-organized data, the method comprising:

recursively collapsing sub-hierarchies of the hierarchically-organized data using encodings, wherein the encodings include orthogonal values;

representing any given node of the hierarchically-organized data as a concatenation of node-specific information with a combination of the orthogonal values for each collapsed sub-hierarchy beneath the given node, wherein the collapsing is order-insensitive with respect to the encodings.

29. The method of claim 28, transforming from a first encoding of the hierarchically-organized data to a collapsed second form.

30. The method of claim 28, employed to eliminate duplicate sub-hierarchies in the hierarchically-organized data.

31. The method of claim 28, employed to collapse duplicate sub-hierarchies in the hierarchically-organized data, wherein the concatenation further includes a count of duplicate sub-hierarchies collapsed beneath any given node.

32. A computer program product encoded in at least one computer readable medium, the computer program product comprising:

a program sequence including a recursively called set of instructions executable by one or more processors to operate on at least one instance of an hierarchically-organized data structure, the instructions, when executed, causing the processor to define a counterpart data structure by collapsing plural nodes of the hierarchically-organized data structure into respective representations wherein, each of the respective representations incorporate information of a respective node and information of any child nodes of the respective node, wherein the collapsing includes an order-insensitive aggregation of orthogonal encodings of information of the respective child nodes; and an object implementing the counterpart data structure including at least one table wherein values of the at least one table provide the orthogonal encodings and keys, wherein the keys combine the information of respective nodes with an aggregation of the collapsed representations for child nodes of the respective nodes.

33. The computer program product of claim 32, wherein the at least one computer readable medium is selected from the set of a disk, tape, other magnetic, optical, and electronic storage medium.

34. An information management tool including software encoded in one or more computer readable media and executable by one or more processors, the information management tool comprising:

an encoding of a hierarchically-organized data structure instantiable in memory addressable by the one or more processors;

instructions executable by the one or more processors to operate on at least one instance of the hierarchically-organized data structure instantiated in memory, the instructions, when executed, causing the processor to define a counterpart data structure in the memory by collapsing plural nodes of the hierarchically-organized data structure into respective representations that each incorporate information of a respective node and information of any child nodes of the respective node, wherein the collapsing includes an order-insensitive aggregation of orthogonal encodings of information of the respective child nodes.

35. An information management tool, as recited in claim 34, further comprising:

matching instructions executable by the one or more processors to identify distinct sub-hierarchies of the hierarchically-organized data structure as at least equivalent based on correspondence of the collapsed representations.

36. An information management tool, as recited in claim 34, further comprising:

matching instructions executable by the one or more processors to identify at least equivalent portions of first and second ones of the hierarchically-organized data structure based on correspondence of collapsed representations thereof.

37. An information management tool, as recited in claim 34,
wherein the order insensitive aggregation is performed recursively at successive levels of a collapsed sub-hierarchy.

38. An information management tool, as recited in claim 34, wherein the counterpart data structure includes:
at least one hash table; and
a recursively encoded mapping wherein, for any particular node of the hierarchically-organized data structure, a corresponding table entry encodes both respective values for child nodes thereof in accordance with the order-insensitive information and aggregation associated with the particular node itself, and
wherein, at least for same-level nodes of the hierarchically-organized data structure, corresponding values are orthogonal.

39. An information management tool, as recited in claim 34,
wherein the hierarchically-organized data structure encodes and a sub-assembly decomposition of a product configuration; and
wherein the information management tool further identifies, based on correspondence of collapsed representations of the hierarchically-organized data structure, equivalent sub-assemblies without regard to ordering of elements thereof.

40. An apparatus for identifying equivalent portions of one or more unsorted hierarchically-organized data structures comprising:
means for collapsing plural nodes of one or more unsorted hierarchically-organized data structures into respective representations, wherein each of the respective representations incorporate information of a respective node and information of any child nodes of the respective node;
wherein the collapsing means is order-insensitive with respect to information of the respective child nodes,
wherein the collapsed representations include respective aggregations of orthogonally-encoded child node information; and
means for identifying equivalent portions of the one or more unsorted hierarchically-organized data structures based on correspondence of particular instances of the collapsed representations.

* * * * *

UNITED STATES PATENT AND TRADEMARK OFFICE
CERTIFICATE OF CORRECTION

| | | |
|---|---|---|
| PATENT NO. | : 7,062,493 B1 | Page 1 of 1 |
| APPLICATION NO. | : 09/898708 | |
| DATED | : June 13, 2006 | |
| INVENTOR(S) | : James Joseph Babka et al. | |

It is certified that error appears in the above-identified patent and that said Letters Patent is hereby corrected as shown below:

On title page, please change Assignee information listed under No. (73) "Trilogy Software, Inc." to --Trilogy Development Group, Inc.--.

Signed and Sealed this

Twenty-seventh Day of February, 2007

JON W. DUDAS
*Director of the United States Patent and Trademark Office*